(12) United States Patent
Hübner et al.

(10) Patent No.: US 9,106,158 B2
(45) Date of Patent: Aug. 11, 2015

(54) PIEZOELECTRIC ROTARY DRIVE FOR A SHAFT

(75) Inventors: Reinhard Hübner, Waldbronn (DE); Harry Marth, Waldbronn (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 0 days.

(21) Appl. No.: 14/236,732

(22) PCT Filed: Aug. 1, 2012

(86) PCT No.: PCT/EP2012/065040
§ 371 (c)(1),
(2), (4) Date: Feb. 3, 2014

(87) PCT Pub. No.: WO2013/020873
PCT Pub. Date: Feb. 14, 2013

(65) Prior Publication Data
US 2014/0239771 A1 Aug. 28, 2014

(30) Foreign Application Priority Data

Aug. 5, 2011 (DE) .......... 10 2011 109 590

(51) Int. Cl.
*H01L 41/09* (2006.01)
*H02N 2/00* (2006.01)
*H02N 2/12* (2006.01)
*H02N 2/10* (2006.01)

(52) U.S. Cl.
CPC .............. *H02N 2/123* (2013.01); *H02N 2/101* (2013.01)

(58) Field of Classification Search
USPC ................................ 310/328, 333
See application file for complete search history.

(56) References Cited

U.S. PATENT DOCUMENTS

| 4,928,030 A | 5/1990 | Culp |
| 5,394,049 A * | 2/1995 | Luecke .................. 310/328 |
| 5,410,206 A | 4/1995 | Luecke et al. |

(Continued)

FOREIGN PATENT DOCUMENTS

| DE | 601 10 107 T2 | 1/2006 |
| EP | 0 863 556 A1 | 9/1998 |

(Continued)

OTHER PUBLICATIONS

International Search Report (PCT/ISA/210) mailed on Oct. 22, 2012, by the European Patent Office as the International Searching Authority for International Application No. PCT/EP2012/065040.

(Continued)

*Primary Examiner* — Thomas Dougherty
(74) *Attorney, Agent, or Firm* — Buchanan Ingersoll & Rooney PC

(57) ABSTRACT

A piezoelectric rotary drive for a shaft, is disclosed which can include a piezoelectric actuator and a coupling portion for driving the shaft as a stick-slip drive. To transmit greater contact forces between the frame and the shaft, at least one piezoelectric actuator and an adjustable and/or deformable frame with at least one coupling portion can be coupled to the shaft in a force-locked manner so as to accomplish a stick-slip drive, wherein the frame translates a piezoelectric deformation of the actuator mechanically such that the coupling portion rotates about the axis of the shaft over at least a part of the circumference of the shaft.

19 Claims, 2 Drawing Sheets

(56) References Cited

U.S. PATENT DOCUMENTS

| | | | |
|---|---|---|---|
| 5,712,524 A * | 1/1998 | Suga | 310/328 |
| 6,940,210 B2 * | 9/2005 | Karrai et al. | 310/328 |
| 7,196,453 B2 * | 3/2007 | Izenson et al. | 310/316.01 |
| 7,564,168 B2 | 7/2009 | Konishi et al. | |
| 8,674,585 B2 * | 3/2014 | Blume et al. | 310/323.02 |
| 2004/0074300 A1 | 4/2004 | Karrai et al. | |
| 2006/0232168 A1 | 10/2006 | Konishi et al. | |
| 2007/0164635 A1 | 7/2007 | Witteveen et al. | |
| 2007/0176514 A1 * | 8/2007 | Lei et al. | 310/328 |
| 2008/0258578 A1 * | 10/2008 | Takahashi et al. | 310/328 |
| 2010/0038995 A1 | 2/2010 | Claeyssen et al. | |
| 2010/0290138 A1 | 11/2010 | Thomas et al. | |

FOREIGN PATENT DOCUMENTS

| | | |
|---|---|---|
| JP | 2006-311788 A | 11/2006 |
| JP | 2012-010517 A | 1/2012 |
| WO | WO 02/37535 A2 | 5/2002 |
| WO | WO 2006/000118 A1 | 1/2006 |
| WO | WO 2008/087469 A2 | 7/2008 |

OTHER PUBLICATIONS

International Preliminary Report on Patentability (PCT/IPEA/409) mailed on Jul. 31, 2013, by the European Patent Office as the International Examining Authority for International Application No. PCT/EP2012/065040.

Search Report mailed on Apr. 2, 2012, by the German Patent Office for Application No. 10 2011 109 590.3.

Office Action issued Jun. 10, 2014, by the Japan Patent Office in corresponding Japanese Patent Application No. 2014-519582. (2 pages).

* cited by examiner

PIEZOELECTRIC ROTARY DRIVE FOR A SHAFT

The invention relates to a piezoelectric rotary drive for a shaft, comprising a piezoelectric actuator (respectively piezo actuator or actuator) and a coupling portion which can be coupled to the shaft in a force-locked manner for driving the shaft.

The U.S. Pat. No. 5,410,206 A document discloses a piezoelectric rotary drive for a shaft, comprising a piezoelectric actuator and a frame having two clamping jaws which can be coupled to the shaft in a force-locked manner for driving the shaft and can be moved by driving the actuator in opposite directions substantially tangentially to the circumference of the shaft so as to cause the shaft to rotate.

This rotary drive is capable of transmitting only small contact forces owing to the small contact surfaces between the clamping jaws and the shaft, which is considered to be a disadvantage.

The invention is based on the object to provide a piezoelectric rotary drive for a shaft which is capable of transmitting greater contact forces between the frame and the shaft.

In order to solve the object underlying the invention the invention provides the piezoelectric rotary drive for a shaft according to claim 1, comprising at least one piezoelectric actuator and an adjustable and/or deformable frame with at least one coupling portion which can be coupled to the shaft in a force-locked manner so as to accomplish a stick-slip drive, wherein the frame mechanically translates a piezoelectric deformation of the actuator such that the coupling portion rotates about the axis of the shaft over at least a part of the circumference of the shaft. Within the scope of the invention the coupling portion may be coupled to the shaft in a force-locked manner directly (first embodiment; cf. FIG. 1, 2a/b) or indirectly, in particular by an intermediate piece (second embodiment; cf. FIG. 3, 4a/b), so as to accomplish the stick-slip drive.

With the so-called stick-slip drive an advance of the shaft is caused by the coupling portion during the stick phase, while the shaft is not advanced during the slip phase owing to a relative movement between the coupling portion and the shaft. In order to achieve an advance the piezo actuator is electrically driven to expand or contract relatively slowly so that owing to the friction between the coupling portion and the shaft to be driven the shaft is carried along by the respective movement of the coupling portion. This phase is referred to as stick phase. In the subsequent slip phase, again, the piezoelectric actuator is electrically driven to rapidly contract or expand, so that owing to the inertia of the shaft the shaft is not carried along by the corresponding fast movement of the coupling portion, and the coupling portion slides along the shaft. In this design, the drive acts in both directions, i.e. either the piezo actuator expands slowly at first and subsequently contracts rapidly, or vice versa. The expansion and contraction of the piezo actuator resulting from the electrical driving will be referred to as piezoelectric deformation of the actuator below. Preferably, the coupling portion rotates in the stick phase with the shaft, respectively at the same angular speed as the shaft and the axis thereof, so that no relative movement occurs between the coupling portion and the shaft. A shaft as defined within the scope of the invention is any rod-shaped machine element for transmitting rotational movements and torques, as well as for supporting rotating components, in particular also an axle or a shaft. The shaft may also be designed as a hollow shaft. Also, the term "shaft" designates a rod-shaped machine element which serves to convert a rotatory motion into a translational motion.

With the piezoelectric rotary drive according to the invention the frame substantially assumes a function comparable to that of a crank mechanism in power engines because it translates an oscillating translational motion into a rotatory motion. According to the solution according to the invention in particular a conversion of the oscillating translational piezoelectric deformation of the actuator into the rotatory motion of the coupling portion is achieved. By this, the coupling portion is able to rotate jointly with the shaft about the axis thereof in the stick phase so that a relative movement between the frame and the shaft in the stick phase is prevented or at least largely reduced. At the same time, the coupling portion can be contacted with the circumference of the shaft over a large area and greater contact forces can be transmitted, as compared with a conventional piezoelectric rotary drive.

Advantageous embodiments are defined in the dependent claims.

It may be an advantage if the coupling portion is flexibly connected to at least one other portion of the frame by means of a hinge, preferably a flexure hinge, so that the coupling portion and the other portion of the frame are pivotable relative to each other by the hinge. The hinge allows a particularly easy translation of the piezoelectric deformation of the actuator into a rotational movement about the axis of the shaft nearly without energy losses.

It may prove to be useful if, when the coupling portion is pivoted, the hinge is displaced against the other portion of the frame substantially in the circumferential direction of the shaft. Thus, it is possible to optimally control the rotational movement of the coupling portion about the axis of the shaft, resulting in a particularly effective drive.

It may be practical if a spring, preferably the same spring, pretensions the coupling portion and the shaft and/or the actuator and/or the other portion of the frame relative to each other. This other portion of the frame is preferably a support portion which is moment-supported with respect to a stationary structure part. Thus, the support portion is equally able to perform a rotational movement, respectively pivoting movement, which supports the pivoting movement of the coupling portion in a positive way. The spring increases the pressure force between the coupling portion and the shaft. By this, also the adhesive force between the coupling portion and the shaft can be increased so that the coupling portion can be moved faster in the stick phase without sliding relative to the shaft. The use of one common spring allows a reduction of the number of components.

It may be advantageous if the frame is at least section-wise elastically deformable, preferably elastically deformable through bending, and preferably at least section-wise made of an elastic material. Using an at least section-wise elastically deformable frame can make the installation of separate hinge components dispensable and facilitates the production of the frame.

It may prove to be favorable if the coupling portion and the other portion of the frame are integrally connected, wherein the frame is preferably formed in one piece. Thus, the production of the frame can be further facilitated.

It may be an advantage if the piezoelectric actuator is designed as a longitudinal actuator or as shear actuator, wherein the piezoelectric actuator is preferably oriented to be deformed substantially tangentially to the circumference of the shaft. These types of actuator have proved to be particularly advantageous for the intended use described. With this advantageous orientation of the actuator the piezoelectric deformation can be translated particularly easily into a rotational movement of the coupling portion about the axis of the shaft.

It may be useful if the frame is supported, preferably moment-supported, on a stationary structure part. The moment support of the frame on a stationary, respectively fixed structure part allows the more effective translation of the deformation of the frame into a rotational movement of the coupling portion about the axis of the shaft.

It may furthermore be useful if the coupling portion and the shaft are in a threaded engagement. In this design, the threaded engagement may be realized directly, i.e. with a direct contact between the coupling portion and the shaft, or indirectly, i.e. with an indirect contact between the coupling portion and the shaft, e.g. by means of an intermediate part like, for instance, a nut. Thus, on the one hand, an optimized contact geometry is obtained which allows a particularly effective drive of the shaft, and, on the other hand, the possibility is provided to convert the rotary motion of the shaft into a translational displacement thereof.

According to an advantageous further development of the invention the coupling portion fulfills at least one of the following requirements:

- the coupling portion is formed to be substantially rigid allowing it to rotate about the axis of the shaft substantially without deformation over at least a part of the circumference of the shaft.
- the coupling portion surrounds the shaft at least sectionwise, preferably over more than half of the circumference, preferably over the full circumference.
- the coupling portion can be placed against the circumference of the shaft over more than half of the circumference of the shaft.
- the coupling portion is formed substantially U-shaped or O-shaped.
- the coupling portion can be coupled to the shaft in a force-locked manner using an intermediate piece so as to accomplish a stick-slip drive, wherein the intermediate piece preferably comprises at least three clamping jaws which are arranged preferably regularly around the circumference of the shaft so as to clamp the shaft between the clamping jaws, wherein the clamping jaws are particularly preferably flexible and are deformable in a radial direction and/or in a circumferential direction relative to the axis of the shaft.
- the coupling portion is connected, preferably hinged, to at least one frame portion, wherein the frame portion extends preferably substantially tangentially to the circumference of the shaft and is deformed and/or displaced by piezoelectric deformation of the actuator substantially tangentially to the circumference of the shaft, wherein the clamping jaws are particularly preferably flexible and are deformable in a radial direction and/or in a circumferential direction relative to the axis of the shaft.
- the coupling portion is connected, preferably hinged, to two parallel frame portions, wherein the frame portions extend preferably substantially tangentially to the circumference of the shaft and are deformed and/or displaced substantially parallel to each other in opposite directions by a piezoelectric deformation of the actuator.

The above-mentioned features permit the realization of particularly preferred embodiments of the piezoelectric rotary drive according to the invention.

Additional advantageous further developments of the invention are obtained by a combination of the features disclosed in the claims, the description and the drawings.

DETAILED DESCRIPTION OF THE PREFERRED EMBODIMENTS

Figure 1:
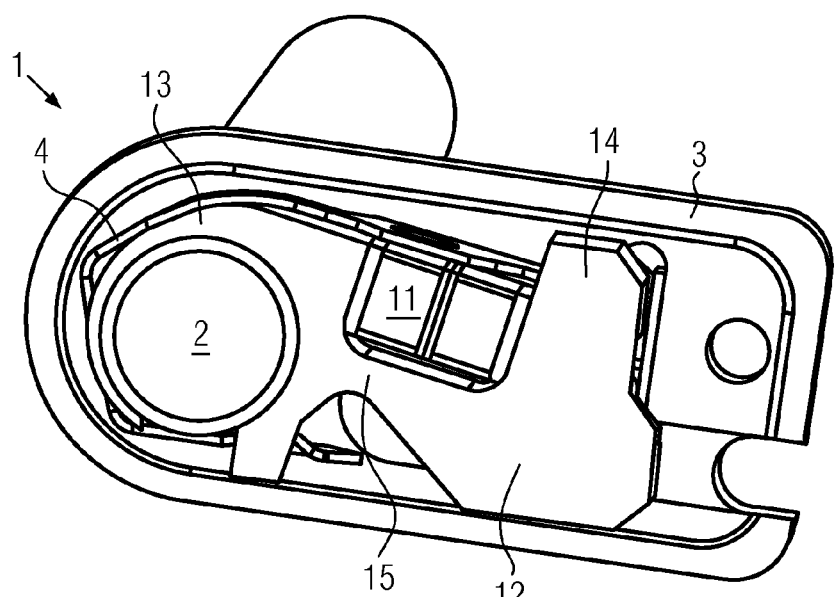
FIG. 1 shows a perspective view of a piezoelectric rotary drive according to a first exemplary embodiment of the invention.

The preferred embodiments will be explained below with reference to the accompanying drawings.

First Embodiment

According to the first embodiment of the invention the piezoelectric rotary drive 1 comprises for at least one shaft 2, which is provided with an external thread, a piezoelectric actuator (respectively piezo actuator or actuator) 11 and an adjustable and/or deformable frame 12 with a coupling portion 13. The coupling portion 13 has an internal thread which is complementary with respect to the external thread of the shaft and can be coupled to the shaft 2 in a force-locked manner so as to accomplish a stick-slip drive, wherein the frame 12 mechanically translates a piezoelectric deformation of the actuator 11 such that the coupling portion 13 rotates about the axis A of the shaft 2 over at least a part of the circumference of the shaft 2. The coupling portion 13 is flexibly connected to at least one other portion 14 of the frame 12 by means of a flexure hinge 15, wherein the coupling portion 13 and the other portion 14 of the frame 12 are pivotable relative to each other by the hinge 15. This other portion 14 of the frame 12 is formed as a support portion which is moment-supported on the frame holder 3, a stationary structure part, so that the other portion 14 of the frame 12 is movably mounted with respect to the frame holder 3.

The stick-slip drive is effected in the above-described manner, by electrically driving the piezoelectric actuator 11 and the piezoelectric deformation of the actuator 11 resulting therefrom.

In the present case, the frame 12 is formed integrally of an elastically deformable material, such as plastic and/or metal. The coupling portion 13 provided with an internal thread is substantially U-shaped and surrounds the shaft 2, which is provided with an external thread, over more than half of the circumference thereof. The portions 13, 14 can be pivoted relative to each other by an elastic bending deformation of the frame 12 in the region of the flexure hinge 15 which is obtained by the piezoelectric deformation of the actuator 11. The flexure hinge 15 is obtained by a region with a reduced flexural rigidity relative to the two adjacent portions 13, 14 having a greater flexural rigidity, e.g. by a constriction between portions 13, 14. Upon pivoting the two portions 13, 14 about a common pivot axis S, which extends substantially parallel to the axis A of the shaft 2 and is located between the two portions 13, 14, the hinge 15, respectively the pivot axis S is displaced substantially in the circumferential direction of the shaft 2 so that the coupling portion 13 performs a rotational movement about the axis A of the shaft 2 by actuation of the piezoelectric actuator 11.

A clamping force generated by a spring clip 4 acts on the coupling portion 13, on the one hand to increase the contact pressure of the coupling portion 13 against the shaft 2 and, on the other hand, to press the two portions 13, 14 of the frame 12 by the spring clip 4 against the piezoelectric actuator 11, so that the portions 13, 14 always follow a piezoelectric deformation of the actuator 11. In this case, it may be advantageous if the actuator 11 is additionally permanently connected to the frame 12, e.g. by bonding.

The mode of operation of the piezoelectric rotary drive according to the first embodiment will be explained below by means of the schematic mechanical model shown in FIG. 2, wherein the piezoelectric rotary drive is illustrated in two different positions in views (a) and (b).

Figure 2A:
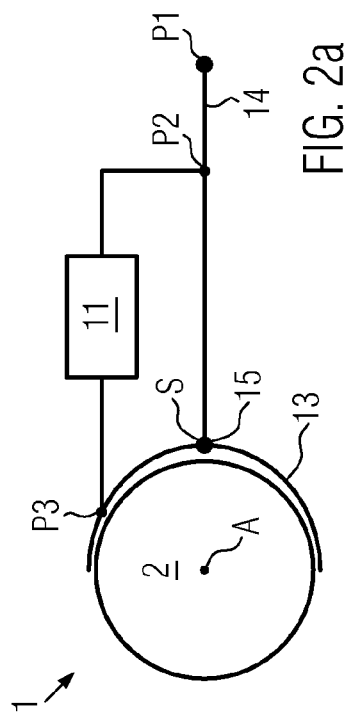
FIGS. 2A and 2B show different views of a schematic mechanical model of the piezoelectric rotary drive according to the first exemplary embodiment of the invention, wherein the piezoelectric rotary drive is in a neutral position in view (a) and in a displaced position in view (b).
Figure 2B:
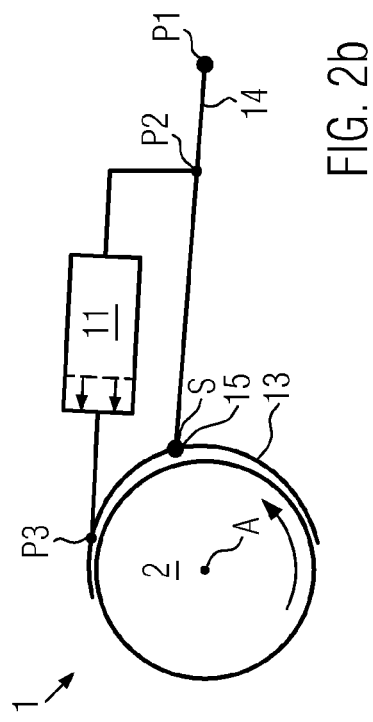

In the schematic mechanical model according to FIG. 2 it is assumed for the sake of simplification that the support portion 14 is moment-supported on the stationary frame holder 3 at a first point P1, and the piezoelectric actuator 11 is coupled to the support portion 14 at a second point P2, and to the coupling portion 13 at a third point P3. The piezoelectric actuator 11 is, in this case, clamped between the two portions 13, 14 by means of the spring element (not shown in FIG. 2). The actuator 11 is preferably oriented such that the working direction (respectively the direction of the piezoelectric deformation) of the actuator 11 runs substantially tangentially to the circumference of the shaft 2. Other orientations and attachments of the actuator 11 are feasible as well. The two portions 13, 14 are flexibly connected by the flexure hinge 15 and pivotable relative to each other by the pivot axis S. The point P1 and the axis A of the shaft 2 are assumed to be stationary. A piezoelectric deformation of the actuator 11 allows the variation of the distance of points P2 and P3. The hinged coupling of both portions 13, 14 by the flexure hinge 15 transfers the change of distance of points P2 and P3 into a pivoting movement about the pivot axis S. The frame 12 is subjected to a bending deformation in the region of the flexure hinge 15, and the coupling portion 13 rotates about the axis A of the shaft 2. The hinge 15 is displaced substantially in the circumferential direction of the shaft 2 as the two portions 13, 14 pivot. By an expansion of the piezoelectric actuator 11 from the neutral position shown in FIG. 2a, for instance, the distance of points P2 and P3 is increased, and the coupling portion 13 is rotated counterclockwise about the axis A of the shaft 2. The displaced position resulting therefrom is shown in FIG. 2b. By a subsequent contraction of the piezoelectric actuator 11 in the opposite direction the neutral position according to FIG. 2a is assumed again. By using the above-described stick-slip effect it is possible that the shaft 2 be optionally driven clockwise or counterclockwise, depending on whether initially a slow or a fast expansion, with a subsequent fast, respectively slow contraction of the piezoelectric actuator is realized.

Second Embodiment

The second embodiment of the invention is essentially based on the first embodiment. Like reference numbers will be used for like features in the description given below and, substantially, the differences over the first embodiment will be described.

Figure 3:
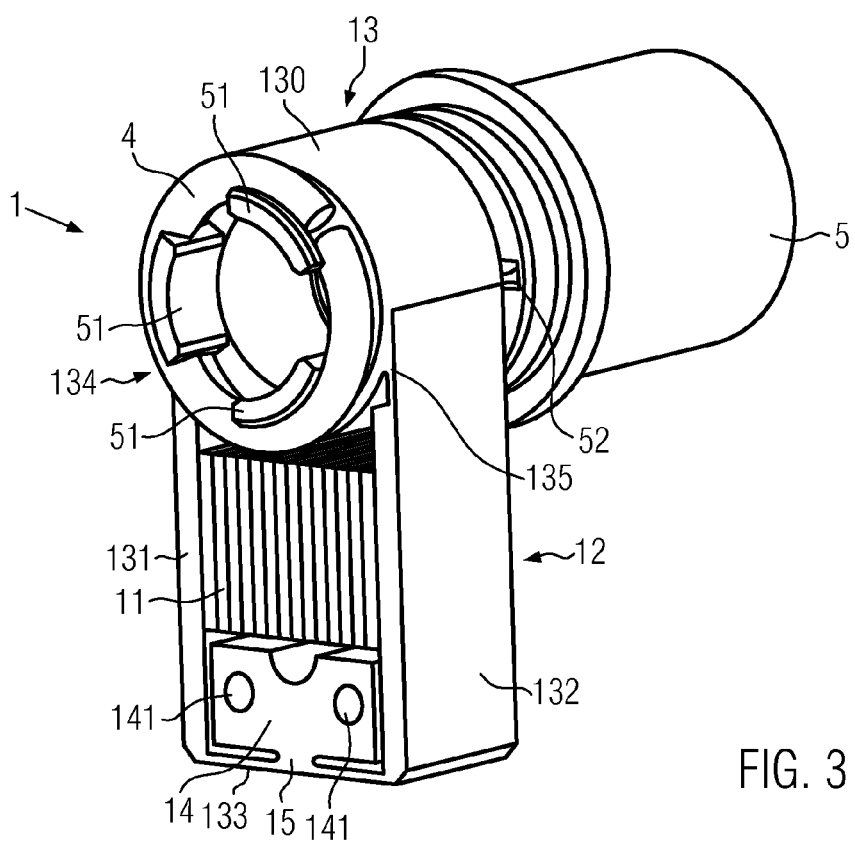
FIG. 3 shows a perspective view of a piezoelectric rotary drive according to a second exemplary embodiment of the invention.

According to the second embodiment of the invention, which is perspectively shown in FIG. 3, the coupling portion 13 of the frame 12 is closed over the full circumference of the shaft (not shown) and can be (indirectly) coupled to the shaft in a force-locked manner by a separate intermediate element 5 so as to accomplish the above-described stick-slip effect. This intermediate element 5 is permanently connected to the frame 12 (e.g. by bonding) and comprises, in the front end portion, three concentric ring portions 51 as clamping jaws which are engaged (by the threads) with the shaft. The ring portions 51 are preferably pressed against the shaft 2 by an annular spring element 4 so as to increase the contact pressure. In this design, the coupling portion 13 comprises, in addition to the annular part 130 enclosing the shaft, two substantially parallel frame portions 131, 132 which extend substantially tangentially to the annular part 130, respectively substantially tangentially to the shaft, and are connected by a web 133. The frame portions 131, 132 are flexibly coupled to the annular part 130 by hinges 134, 135, preferably flexure hinges. The web 133, in turn, is flexibly connected to the support portion 14 by a flexure hinge 15, the support portion 14 being supported on a non-illustrated stationary structure element, e.g. a frame holder. Mounting holes 141 are provided, for instance, to receive mounting pins. In the second embodiment of the invention a shear actuator 11 is used, which is arranged between the frame portions 131, 132 and produces a parallel displacement of the frame portions 131, 132 by driving it correspondingly. The deformation of the frame 12 is transmitted to the intermediate element 5 to perform a rotational movement about the axis of the shaft 2 in the front portion. This rotational movement is made possible by webs 52 acting as flexure hinge.

The mode of operation of the piezoelectric rotary drive according to the second embodiment will be explained below by means of the schematic mechanical model shown in FIG. 4, wherein the piezoelectric rotary drive is illustrated in different positions in views (a) and (b).

Figure 4A:
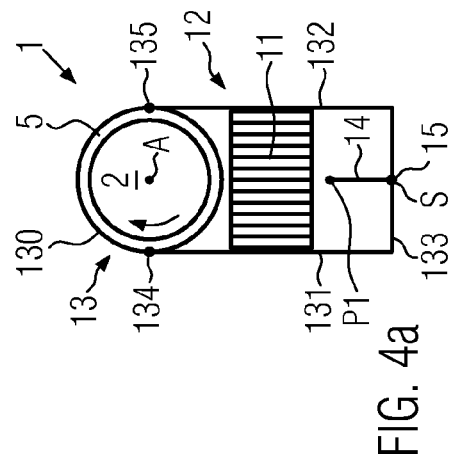
FIGS. 4A and 4B show different views of a schematic mechanical model of the piezoelectric rotary drive according to the second exemplary embodiment of the invention, wherein the piezoelectric rotary drive is in a neutral position in view (a) and in a displaced position in view (b).
Figure 4B:
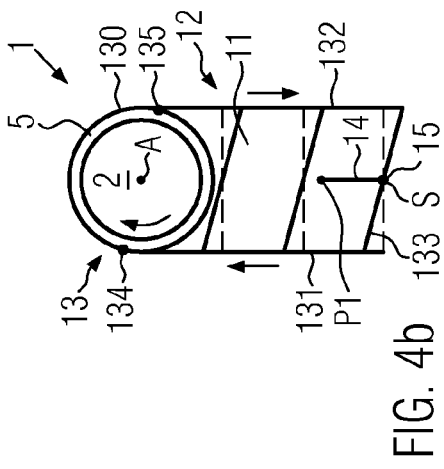

In the schematic mechanical model according to FIG. 4 it is assumed for the sake of simplification that the support portion 14 is coupled to a non-illustrated stationary structure element at a first point P1, and the piezoelectric shear actuator 11 is arranged between the frame portions 131, 132 in order to produce a parallel displacement of the frame portions 131, 132 by the corresponding piezoelectric deformation. The support portion 14 and the web 133 of the coupling portion 13 are flexibly connected by the flexure hinge 15 and pivotable relative to each other by the pivot axis S. Point P1 and axis A of shaft 2 are assumed to be stationary. By a piezoelectric shear deformation of the actuator 11 the frame portions 131, 132 are displaced parallel to each other. By the flexible coupling of the web 133 to the portion 14 and the flexible coupling of the frame portions 131, 132 to the annular part 130 the deformation of the frame 12 is mechanically translated into a rotational movement such that the annular part 130 of the coupling portion 13 rotates about the axis A of the shaft 2. In the above-described manner the rotational movement of the annular part 130 of the coupling portion 13 is transmitted to the shaft 2 by the intermediate piece 5. By a shear deformation of the piezoelectric actuator 11 from the neutral position shown in FIG. 2a, for example, the frame portion 131 is displaced upwardly and the frame portion 132 downwardly, so that the annular part 130 of the coupling portion 13 rotates clockwise about the axis A of the shaft 2. The displaced position resulting therefrom is shown in FIG. 2b. By the subsequent return shear deformation of the piezoelectric actuator 11 the drive goes back to the neutral position according to FIG. 2a. Depending on whether the shear deformation takes place slowly or fast and the corresponding return shear deformation, vice versa, fast, respectively slowly the shaft 2 can be driven optionally clockwise or counterclockwise using the above-described stick-slip effect.

Summarizing, the differences between the embodiments are as follows:

The rotary drive 1 according to the first embodiment is essentially more compact and simpler in structure, and uses a longitudinal actuator. The rotation of the coupling portion 13 about the axis A of the shaft 2 becomes possible by a pivoting movement about a portion of the frame 12 acting as flexure hinge 15. The coupling portion 13 is, in this design, pressed against the shaft 2 by a spring element 4, with the coupling portion 13 and the shaft 2 being in threaded engagement.

The rotary drive 1 according to the second embodiment is clearly more complex in structure; a shear actuator is here being used. This shear actuator initially induces a parallel displacement of the respective frame portions 131, 132. Permanently connected to frame 12, e.g. by bonding, is an intermediate element 5 (e.g. a nut) which comprises, in the front end portion, three concentric ring portions 51 serving as clamping jaws and being engaged (by the threads) with the shaft 2. The deformation of the frame 12 is transmitted to the intermediate element 5 by which same performs a rotational movement in the front portion. This rotational movement becomes possible by webs 52 which act as flexure hinge.

The invention claimed is:

1. A piezoelectric rotary drive for a shaft, comprising:
   at least one piezoelectric actuator; and
   an adjustable and/or deformable frame with at least one coupling portion for coupling to the shaft in a force-locked manner so as to accomplish a stick-slip drive, wherein the frame is configured to mechanically translate a piezoelectric deformation of the actuator such that the coupling portion will rotate about an axis of the shaft over at least a part of a circumference of the shaft, wherein at least one spring pretensions the coupling portion and the shaft relative to each other, the coupling portion is flexibly connected to one other portion of the frame by one hinge, so that the coupling portion and the other portion of the frame are pivotable relative to each other by the hinge, the coupling portion is substantially U-shaped and surrounds the shaft over more than half of the circumference of the shaft.

2. A piezoelectric rotary drive according to claim 1, wherein, when the coupling portion is pivoted, the hinge is displaced against the other portion of the frame substantially in a circumferential direction of the shaft.

3. A piezoelectric rotary drive according to claim 1, wherein the frame is at least section-wise elastically deformable.

4. A piezoelectric rotary drive according to claim 1, wherein the coupling portion and the other portion of the frame are integrally connected, wherein the frame is formed in one piece.

5. A piezoelectric rotary drive according to claim 1, wherein the piezoelectric actuator is configured as a longitudinal actuator or as shear actuator, wherein the piezoelectric actuator is oriented to be deformed substantially tangentially to the circumference of the shaft.

6. A piezoelectric rotary drive according to claim 1, wherein the frame is moment-supported, on a stationary structure part.

7. A piezoelectric rotary drive according to claim 1, wherein the coupling portion and the shaft are in a threaded engagement.

8. A piezoelectric rotary drive according to claim 1, wherein the coupling portion fulfills at least one of the following requirements:
   a. the coupling portion is formed to be substantially rigid allowing it to rotate about the axis of the shaft substantially without deformation over at least a part of the circumference of the shaft;
   b. the coupling portion surrounds the shaft at least section-wise, over more than half of the circumference;
   c. the coupling portion can be placed against the circumference of the shaft over more than half of the circumference of the shaft;
   d. the coupling portion can be coupled to the shaft in a force-locked manner using an intermediate piece so as to accomplish a stick-slip drive, wherein the intermediate piece comprises at least three clamping jaws which are arranged regularly around the circumference of the shaft so as to clamp the shaft between the clamping jaws, wherein the clamping jaws are flexible and are deformable in a radial direction and/or in a circumferential direction relative to the axis of the shaft;
   e. the frame portion extends substantially tangentially to the circumference of the shaft and is deformed and/or displaced by piezoelectric deformation of the actuator substantially tangentially to the circumference of the shaft; and
   f. the coupling portion is hinge connected to two parallel frame portions, wherein the frame portions extend substantially tangentially to the circumference of the shaft and are deformed and/or displaced substantially parallel to each other in opposite directions by a piezoelectric deformation of the actuator.

9. A piezoelectric rotary drive of claim 1, wherein said at least one spring pretensions the coupling portion and the shaft, and the actuator and the other portion of the frame relative to each other.

10. A piezoelectric rotary drive of claim 1, wherein the hinge is a flexure hinge.

11. A piezoelectric rotary drive according to claim 1, wherein, when the coupling portion is pivoted, the hinge is displaced against the other portion of the frame substantially in a circumferential direction of the shaft.

12. A piezoelectric rotary drive according to claim 1, wherein the frame is at least section-wise elastically deformable through bending, and is at least section-wise made of an elastic material.

13. A piezoelectric rotary drive according to claim 11, wherein the frame is at least section-wise elastically deformable through bending, and is at least section-wise made of an elastic material.

14. A piezoelectric rotary drive according to claim 13, wherein the coupling portion and the other portion of the frame are integrally connected, wherein the frame is formed in one piece.

15. A piezoelectric rotary drive according to claim 14, wherein the piezoelectric actuator is configured as a longitudinal actuator or as shear actuator, wherein the piezoelectric actuator is oriented to be deformed substantially tangentially to the circumference of the shaft.

16. A piezoelectric rotary drive according to claim 15, wherein the frame is moment-supported, on a stationary structure part.

17. A piezoelectric rotary drive according to claim 16, wherein the coupling portion and the shaft are in a threaded engagement.

18. A piezoelectric rotary drive according to claim 1, wherein the coupling portion rotates together with the shaft in a stick phase of the stick-slip drive.

19. A piezoelectric rotary drive for a shaft, comprising:
   at least one piezoelectric actuator; and
   an adjustable and/or deformable frame with at least one coupling portion for coupling to the shaft in a force-locked manner so as to accomplish a stick-slip drive, wherein the frame is configured to mechanically translate a piezoelectric deformation of the actuator such that the coupling portion will rotate about an axis of the shaft over at least a part of a circumference of the shaft, wherein at least one spring pretensions the coupling portion and the shaft relative to each other, the coupling portion comprises an annular part enclosing the shaft, the annular part is flexibly connected to two other portions of the frame by two hinges, so that the annular part of the coupling portion and the other portions of the frame are pivotable relative to each other by the hinges.

* * * * *